US008101540B2

(12) United States Patent
Deevi et al.

(10) Patent No.: US 8,101,540 B2
(45) **Date of Patent: *Jan. 24, 2012**

(54) CATALYSTS FOR LOW TEMPERATURE OXIDATION OF CARBON MONOXIDE

(75) Inventors: Sarojini Deevi, Midlothian, VA (US); Unnikrishnan Pillai, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,590

(22) Filed: Oct. 19, 2009

(65) Prior Publication Data

US 2010/0068120 A1 Mar. 18, 2010

Related U.S. Application Data

(62) Division of application No. 11/371,021, filed on Mar. 9, 2006, now Pat. No. 7,622,421.

(60) Provisional application No. 60/660,545, filed on Mar. 11, 2005.

(51) Int. Cl.

| | |
|---|---|
| ***B01J 23/10*** | (2006.01) |
| ***B01J 23/06*** | (2006.01) |
| ***B01J 23/72*** | (2006.01) |
| ***B01J 23/80*** | (2006.01) |
| ***B01J 23/83*** | (2006.01) |

(52) U.S. Cl. ......................... 502/304; 502/343; 502/345

(58) Field of Classification Search .................. 502/304, 502/343, 345

See application file for complete search history.

(56) References Cited

U.S. PATENT DOCUMENTS

| | | | | |
|---|---|---|---|---|
| 4,054,609 A | | 10/1977 | Osugi et al. | |
| 4,257,920 A | * | 3/1981 | Sugier et al. | 502/302 |
| 5,143,098 A | | 9/1992 | Rogers et al. | |
| 5,322,075 A | | 6/1994 | Deevi et al. | |
| 5,591,368 A | | 1/1997 | Fleischhauer et al. | |

(Continued)

FOREIGN PATENT DOCUMENTS

WO WO 2005/002370 * 1/2005

OTHER PUBLICATIONS

Velu et al. "Selective production of hydrogen for fuel cells via oxidative steam reforming of methanol over CuZnAI oxide catalysts: effect of substitution of zirconium and cerium on the catalytic performance." Topics in Catalysis, vol. 22, Nos. 3-4 (2003), pp. 235-244.*

Baker, Richard R., "*Mechanisms of Smoke Formation and Delivery*," Recent Advances in Tobacco Science, vol. 6, 1980, pp. 184-224.

Baker, Richard R., "*Variation of the Gas Formation Regions within a Cigarette Combustion Coal during the Smoking Cycle*," Beiträge zur Tabakforschung International, vol. 11, No. 1, Mar. 1981, pp. 1-17.

*Primary Examiner* — Stuart Hendrickson
*Assistant Examiner* — Daniel Berns
(74) *Attorney, Agent, or Firm* — Buchanan Ingersoll & Rooney PC

(57) ABSTRACT

$CuO—ZnO—CeO_2$ catalyst and aged CuO—ZnO catalyst catalytically active for low temperature oxidation of carbon monoxide. The catalysts are co-precipitated, filtered, washed, dried, and calcined. The catalysts can be incorporated into a component of a cigarette or can be used to reduce the concentration of carbon monoxide from a vehicle exhaust emission, a gas used in a laser, a gas used in a fuel cell and/or ambient air undergoing air filtration.

4 Claims, 5 Drawing Sheets

U.S. PATENT DOCUMENTS

| | | | | |
|---|---|---|---|---|
| 5,934,289 | A | 8/1999 | Watkins et al. | |
| 6,053,176 | A | 4/2000 | Adams et al. | |
| 6,323,347 | B2 | 11/2001 | Chen et al. | |
| 6,857,431 | B2 | 2/2005 | Deevi et al. | |
| 7,243,658 | B2 * | 7/2007 | Deevi et al. | 131/334 |
| 7,640,936 | B2 * | 1/2010 | Rabiei et al. | 131/365 |
| 2004/0250828 | A1 | 12/2004 | Luan et al. | |
| 2007/0095358 | A1 * | 5/2007 | Li et al. | 131/365 |

* cited by examiner

CATALYSTS FOR LOW TEMPERATURE OXIDATION OF CARBON MONOXIDE

CROSS-REFERENCE TO RELATED APPLICATIONS

This application is a divisional application of U.S. application Ser. No. 11/371,021 entitled CATALYSTS FOR LOW TEMPERATURE OXIDATION OF CARBON MONOXIDE, filed on Mar. 9, 2006 now U.S. Pat. No. 7,622,421, which claims priority under 35 U.S.C. §119 to U.S. Provisional Application No. 60/660,545 entitled CATALYSTS FOR LOW TEMPERATURE OXIDATION OF CARBON MONOXIDE, filed Mar. 11, 2005, the entire content of each is hereby incorporated by reference.

BACKGROUND

Cigarettes produce both mainstream smoke during a puff and sidestream smoke during static burning. Constituents of both mainstream smoke and sidestream smoke are carbon monoxide (CO) and nitric oxide (NO). The reduction of carbon monoxide and/or nitric oxide in smoke is desirable.

SUMMARY

Disclosed is a method of forming a copper oxide-zinc oxide catalyst comprising co-precipitating a mixture of copper hydroxide and zinc hydroxide, aging the mixture, optionally filtering the mixture, optionally washing the mixture with deionized water, drying the mixture, and calcining the mixture to form the copper oxide-zinc oxide catalyst.

The copper hydroxide can be precipitated from copper nitrate and the zinc hydroxide can be precipitated from zinc nitrate. The mixture can be formed by drop-wise addition of an aqueous solution of sodium hydroxide to an aqueous solution of copper nitrate and zinc nitrate. The mixture can be aged at a temperature of between 50° C. and 70° C. for at least about 3 hours. The mixture can be dried at a temperature of between about 100° C. and 120° C. The mixture can be calcined at a temperature of between about 350° C. and 550° C. for at least about 4 hours. The copper oxide-zinc oxide catalyst is preferably capable of room temperature oxidation of carbon monoxide.

Also disclosed is a method of forming a copper oxide-zinc oxide-cerium oxide catalyst comprising co-precipitating a mixture of copper hydroxide, zinc hydroxide, and cerium hydroxide, optionally filtering the mixture, optionally washing the mixture with deionized water, drying the mixture, and calcining the mixture to form the copper oxide-zinc oxide-cerium oxide catalyst.

The copper hydroxide can be precipitated from copper nitrate, the zinc hydroxide can be precipitated from zinc nitrate, and the cerium hydroxide can be precipitated from cerium nitrate. The mixture can be formed by drop-wise addition of an aqueous solution of sodium hydroxide to an aqueous solution of copper nitrate, zinc nitrate, and cerium nitrate. The mixture can be dried at a temperature of between about 100° C. and 120° C. The mixture can be calcined at a temperature of between about 350° C. and 550° C. for at least about 4 hours. The copper oxide-zinc oxide-cerium oxide catalyst is preferably capable of room temperature oxidation of carbon monoxide.

Further disclosed is a catalyst catalytically active for oxidation of carbon monoxide comprising copper oxide, zinc oxide, and cerium oxide.

DETAILED DESCRIPTION OF PREFERRED EMBODIMENTS

Figure 1:
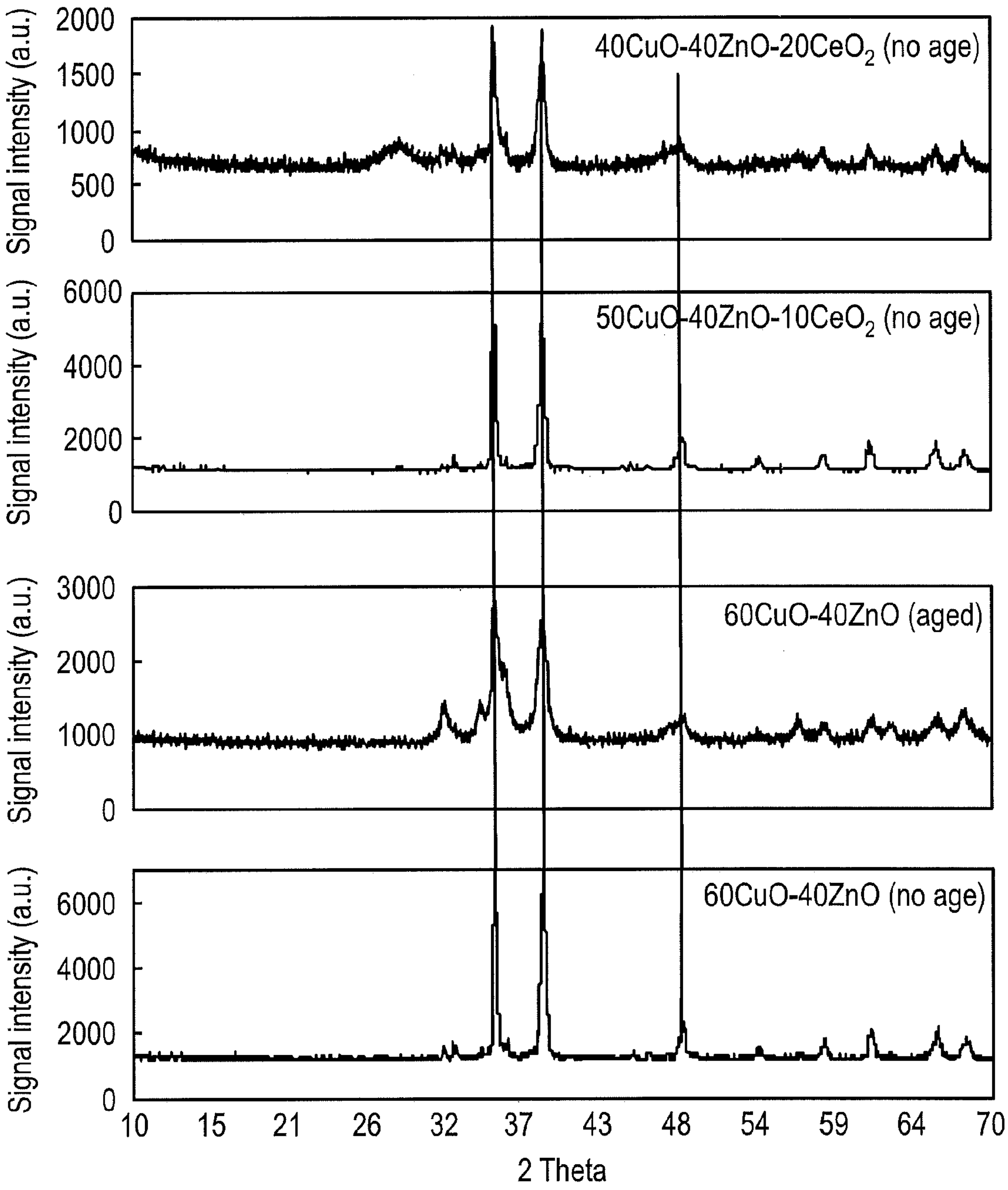
FIG. 1 shows x-ray diffraction spectra for catalysts of 40CuO-40ZnO-20$CeO_2$, 50CuO-40ZnO-10$CeO_2$, aged 60CuO-40ZnO, and 60CuO-40ZnO.

Disclosed are CuO—ZnO—$CeO_2$ and aged CuO—ZnO catalysts for oxidation of CO. Preferably, complete oxidation of CO to $CO_2$ can be achieved over the catalysts at ambient temperature. As used herein, "ambient" means temperatures from about 20° C. to about 40° C. and "low temperature" means temperatures below about 200° C. As used herein, a "catalyst" is capable of affecting the rate of a chemical reaction, e.g., a catalyst can increase the rate of oxidation of CO to $CO_2$ without participating as a reactant or product of the reaction. As used herein, an "aged" catalyst is a catalyst that is formed by aging a precipitate or co-precipitate prior to drying and calcining the precipitate or co-precipitate to form the catalyst. All percentages disclosed herein are percentages by weight, unless disclosed otherwise.

The catalyst can be incorporated into a component of a cigarette (e.g., tobacco cut filler, cigarette paper and/or cigarette filter material). The catalyst can also be used to reduce the concentration of carbon monoxide from gases such as a vehicle exhaust emission, a gas used in a laser, a gas used in a fuel cell and/or ambient air undergoing air filtration. The catalyst may be incorporated into a vehicle exhaust emissions system in an amount effective to oxidize carbon monoxide to carbon dioxide. The catalyst may also be incorporated in a catalytic converter for emissions reduction in the cold starting of an automobile engine in an amount effective to oxidize carbon monoxide to carbon dioxide. The catalyst may be incorporated into a laser in an amount effective to oxidize carbon monoxide to carbon dioxide. The catalyst can be incorporated into a fuel cell in an amount effective to oxidize carbon monoxide to carbon dioxide. The catalyst can be used in an air filter for the conversion of carbon monoxide and/or indoor volatile organic compounds.

An aged CuO—ZnO catalyst can be prepared by co-precipitating a mixture of copper hydroxide and zinc hydroxide from a suitable copper salt and zinc salt, respectively, aging the mixture, filtering, washing, and drying the mixture, and calcining the mixture to form the copper oxide-zinc oxide catalyst. Zinc oxide helps form a well-dispersed phase of copper oxide.

Aging of the mixture while in the parent solution results in intimate contact of the precipitate precursors with the precipitating agent. Without wishing to be bound by theory, it is believed that aging of the mixture results in disintegration of the precipitate, increasing the dispersion of Cu-rich nanoparticles, allowing the precipitate to partially re-dissolve and grow in size, leading to changes in the final catalyst size and surface composition and improved catalytic performance. By "nanoparticles" is meant that the particles have an average particle size of less than about 100 nm (e.g., less than about 50 nm, more preferably less than about 10 nm).

A CuO—ZnO—$CeO_2$ catalyst can be prepared by co-precipitating a mixture of copper hydroxide, zinc hydroxide, and cerium hydroxide from a suitable copper salt, zinc salt, and cerium salt, respectively, filtering, washing, and drying the mixture, and calcining the mixture to form copper oxide-zinc oxide-cerium oxide catalyst. Zinc oxide helps form a well-dispersed phase of copper oxide.

Without wishing to be bound by theory, it is believed that the oxygen-ion-conducting $CeO_2$ has the ability to promote low temperature combustion reactions on copper by way of a synergistic interaction, resulting in surface lattice oxygen vacancies which promote the evolution of active metastable reducible CuO species and improve catalytic activity. The creation of the oxygen vacancies in $CeO_2$ and CuO changes the valence state of copper around the vacancies, thereby forming metastable clusters made up of ion pairs such as $Cu^0$—$Cu^{2+}$, $Cu^+$—$Cu^{2+}$, and $Cu^0$—$Cu^+$. The metastable copper clusters are very reactive due to their enhanced ability to transport surface lattice oxygen to the CO molecules adsorbed on metal sites to form $CO_2$. The reduction of CuO is initiated via the oxygen uptake by the adsorbed CO from the surface CuO clusters. Thus, the labile lattice oxygen or a weakly bound surface oxygen ion may trigger the reduction of CuO at a lower temperature than the normal reduction temperature of the metal oxide. Additionally, CuO—ZnO—$CeO_2$ catalyst exhibits greater stability at elevated temperature (e.g., 50° C.) over an extended reaction period.

Preferably, the mixture of copper hydroxide and zinc hydroxide is formed by increasing the pH of a copper salt and zinc salt solution (e.g., an aqueous or non-aqueous solution of a copper salt and zinc salt) in an amount effective to precipitate copper hydroxide and zinc hydroxide. Exemplary copper salts suitable for forming a copper salt solution include copper nitrate, copper chloride, copper acetate, copper sulfate as well as the hydrates thereof. Exemplary zinc salts suitable for forming a zinc salt solution include zinc nitrate, zinc chloride, zinc acetate, zinc sulfate as well as the hydrates thereof. Preferably, the copper salt and zinc salt solution comprises an aqueous solution of copper nitrate and zinc nitrate.

Preferably, the mixture of copper hydroxide, zinc hydroxide, and cerium hydroxide is formed by increasing the pH of a copper salt, zinc salt, and cerium salt solution (e.g., an aqueous or non-aqueous solution of a copper salt, zinc salt, and cerium salt) in an amount effective to precipitate copper hydroxide, zinc hydroxide, and cerium hydroxide. Exemplary cerium salts suitable for forming a cerium salt solution include cerium nitrate, cerium chloride, cerium acetate, cerium sulfate as well as the hydrates thereof. Preferably, the copper salt, zinc salt, and cerium salt solution comprises an aqueous solution of copper nitrate, zinc nitrate, and cerium nitrate.

A solution of sodium hydroxide, ammonia, or other alkali compound can be used to increase the pH of the copper salt and zinc salt or copper salt, zinc salt, and cerium salt solution. In a preferred embodiment, an aqueous solution of an alkali compound is added drop-wise to an aqueous solution of a copper salt and zinc salt or a copper salt, zinc salt, and cerium salt until the pH of the solution is between about 6 and 8, preferably between about 6.5 and 7.5, more preferably about 7.

The mixture of copper hydroxide and zinc hydroxide is preferably aged at a temperature of between 50° C. and 70° C. for at least about 3 hours, for example, at a temperature of 60° C. for 3 hours. Preferably, the mixture of copper hydroxide and zinc hydroxide or copper hydroxide, zinc hydroxide, and cerium hydroxide is filtered and washed with deionized water prior to drying. Thereafter, the mixture is dried at a temperature of between about 100° C. and 120° C. for at least about 8 hours, for example, at a temperature of 110° C. for 8 hours.

The mixture of copper hydroxide and zinc hydroxide or copper hydroxide, zinc hydroxide, and cerium hydroxide is preferably calcined at a temperature of between about 350° C. and 550° C. for at least about 4 hours, for example, at a temperature of 450° C. for 4 hours. Without wishing to be bound by theory, it is believed that calcination results in the formation of a CuO—ZnO solid solution and that catalyst activity can be correlated to greater amounts of Zn incorporated into CuO due to the higher concentration of Cu-rich nanoparticles in the precursor.

Without wishing to be bound by theory, it is believed that the main factors responsible for the superior performance of the catalysts appear to be (i) surface morphology, (ii) dispersion of copper oxide, (iii) redox properties of the oxide, and (iv) ability to achieve a partially reduced state of copper oxide phase at the interface.

According to an embodiment, the catalyst can be incorporated into one or more components of a cigarette in an amount effective to convert carbon monoxide to carbon dioxide during smoking of the cigarette. Without wishing to be bound by theory, it is believed that during smoking of a cigarette having incorporated therein the catalyst, CO can be oxidized in the presence of oxygen to reduce the level of CO in mainstream and/or sidestream smoke.

The amount of the catalyst incorporated into a cigarette can be selected such that the amount of carbon monoxide in mainstream smoke is reduced during smoking of a cigarette. For example, the total amount of the catalyst per cigarette can be from about 1 to 200 mg, 1 to 50 mg, or 50 to 100 mg. Preferably, the total amount of catalyst per cigarette is an amount effective to convert at least some CO to $CO_2$. Preferably, the catalyst is incorporated in tobacco cut filler, cigarette wrapper and/or a cigarette filter in an amount effective to reduce the concentration in mainstream smoke of carbon monoxide and/or nitric oxide by at least 5% (e.g., by at least 15%, 20%, 25%, 30%, 35%, 40%, 45%, 50%, 55%, 60%, 65%, 70%, 75%, 80%, 85%, 90% or 95%).

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette. The cigarette may also be smoked by other means. For example, the cigarette may be smoked by heating the cigarette and/or heating using electrical heater means as described in commonly-assigned U.S. Pat. Nos. 6,053,176; 5,934,289; 5,591,368 or 5,322,075 the contents of which are hereby incorporated by reference in their entirety.

The term "mainstream" smoke refers to the mixture of gases and/or aerosols passing down the tobacco rod and issuing through the filter end, i.e., the smoke issuing or drawn from the mouth end of a cigarette during smoking of the cigarette. The mainstream smoke contains smoke that is drawn in through both the lighted region, as well as through the cigarette wrapper. The term "sidestream" smoke refers to smoke produced during static burning.

Several factors contribute to the formation of carbon monoxide in a cigarette. In addition to the constituents in the tobacco, the temperature and the oxygen concentration in a cigarette during combustion can affect CO formation. For example, the total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$, are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. Without wishing to be bound by theory, it is believed that the catalyst can target the various reactions that occur in different regions of the cigarette during smoking. The catalyst can convert CO to $CO_2$ in the presence of an external source of oxygen.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. The concentration of oxygen is low in the combustion zone because oxygen is being consumed in the combustion of tobacco to produce carbon monoxide, carbon dioxide, nitric oxide, water vapor and other organic compounds. The low oxygen concentration coupled with the high temperature leads to the reduction of carbon dioxide to carbon monoxide by the carbonized tobacco. In the combustion zone, the catalyst can promote oxidation of carbon monoxide to carbon dioxide as there is some oxygen present. The combustion zone is highly exothermic and the heat generated is carried to the pyrolysis/distillation zone.

The pyrolysis zone is the region behind the combustion zone, where the temperature ranges from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, nitric oxide, carbon and other smoke components using the heat generated in the combustion zone. There is some oxygen present in this region, and thus the catalyst may promote oxidation of carbon monoxide to carbon dioxide.

In the condensation/filtration zone the temperature ranges from ambient to about 60° C. The major process in this zone is the condensation/filtration of the smoke components. Some amount of carbon monoxide and carbon dioxide diffuse out of the cigarette and some oxygen (e.g., air) diffuses into the cigarette. The partial pressure of oxygen in the condensation/filtration zone does not generally recover to the atmospheric level. In the condensation/filtration zone, the catalyst can promote oxidation of carbon monoxide to carbon dioxide in the presence of oxygen.

During the smoking of a cigarette, the mainstream smoke flows toward the filter end of the cigarette. As carbon monoxide travels within the cigarette, oxygen diffuses into and carbon monoxide diffuses out of the cigarette through the wrapper. After a typical 2-second puff of a cigarette, CO is concentrated in the periphery of the cigarette, i.e., near the cigarette wrapper, in front of the combustion zone. Due to diffusion of $O_2$ into the cigarette, the oxygen concentration is also high in the peripheral region. Airflow into the tobacco rod is largest near the combustion zone at the periphery of the smoking article and is approximately commensurate with the gradient of temperature, i.e., higher airflow is associated with larger temperature gradients. In a typical cigarette, the highest temperature gradient is from the combustion zone (>850-900° C.) axially toward the filter end of the cigarette. Within a few millimeters behind the combustion zone the temperature drops to near ambient. Further information on airflow patterns, the formation of constituents in cigarettes during smoking and smoke formation and delivery can be found in Richard R. Baker, "Mechanism of Smoke Formation and Delivery", Recent Advances in Tobacco Science, vol. 6, pp. 184-224, (1980) and Richard R. Baker, "Variation of the Gas Formation Regions within a Cigarette Combustion Coal during the Smoking Cycle", Beiträge zur Tabakforschung International, vol. 11, no. 1, pp. 1-17, (1981), the contents of both are incorporated herein by reference.

The catalyst may be placed in the tobacco cut filler, the cigarette filter, or incorporated in cigarette paper. The catalyst can be placed both in the tobacco cut filler and in other locations. The quantity, location and distribution in a cigarette of the catalyst can be selected as a function of the temperature and airflow characteristics exhibited during smoking in order to adjust, e.g., increase or maximize the conversion rate of CO to $CO_2$.

Once formed, the catalyst may be incorporated into at least one component in the form of a dry powder, paste or dispersion in a liquid. For example, catalyst in the form of a dry powder can be dusted on cut filler, cigarette paper material or filter material. A dispersion of the catalyst can be sprayed on the cut filler, cigarette paper material or filter material.

The catalyst may be incorporated into the tobacco rod of a cigarette. The catalyst may be provided continuously along the length of a tobacco rod or at discrete locations along the length of a tobacco rod. Furthermore, the catalyst may be homogeneously or non-homogeneously distributed along the length of a tobacco rod. The catalyst may be added to cut filler tobacco stock (e.g., loose cut filler) supplied to a cigarette-making machine or incorporated directly on a tobacco rod prior to wrapping a cigarette wrapper around the cigarette rod to form a tobacco column.

Any suitable tobacco mixture may be used for the cut filler. Examples of suitable types of tobacco materials include flue-cured, Burley, Bright, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about $1/10$ inch to about $1/20$ inch or even $1/40$ inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

In addition to or in lieu of incorporating the catalyst in the tobacco rod, the catalyst may be incorporated in cigarette paper before or after the cigarette paper is incorporated into a cigarette. The catalyst may be incorporated into the cellulosic web of the paper by depositing the catalyst directly on the cellulosic web and/or combined with web-filler material that is incorporated in the paper.

The catalyst can be incorporated in cigarette paper by spraying or coating the catalyst onto a wet base (e.g., cellulosic) web, an intermediate web or a finished web. For example, a catalyst powder can be physically admixed with the cigarette paper material during the paper manufacturing process. The catalyst can be coated and/or printed on at least one surface of a paper wrapper (e.g., an interior and/or exterior surface) to form text or images on the cigarette wrapper.

The catalyst can be incorporated into cigarette wrapping paper by incorporating the catalyst directly into the paper web and/or by incorporating the catalyst in web-filler material used in the production of the wrapping paper. The web-filler material can include an oxide, a carbonate, or a hydroxide of a Group II, Group III or Group IV metal, or the web-filler material can be selected from the group consisting of $CaCO_3$, $TiO_2$, $SiO_2$, $Al_2O_3$, $MgCO_3$, MgO and $Mg(OH)_2$.

In practice, the web-filler material serves as an agent for controlling the permeability of the wrapper (measured typically in units of Coresta, which is defined as the volume of air, measured in cubic centimeters, that passes through one square centimeter of material in one minute at a pressure drop of 1.0 kilopascals) and also can serve as a support for the catalyst.

A catalyst-modified web-filler comprises the catalyst incorporated in and/or on web-filler. In a preferred example, the web-filler material is $CaCO_3$ or other conventional filler material used in cigarette wrapper manufacture such as ALBACAR® 5970, which is calcium carbonate commercially available from Specialty Minerals of Bethlehem, Pa.

Aqueous slurry of the catalyst and the web-filler material can be incorporated into the head box of a paper-making machine and the mixture of catalyst and web filler material can be incorporated into cigarette paper during the paper-making process.

The catalyst and filler can be provided in any desired ratio, e.g., 10 to 90 wt. % catalyst and 90 to 10 wt. % web-filler material. In a preferred embodiment, the amount of web-filler material in the wrapper (both catalyst-modified web-filler and/or web-filler material without catalyst) can be from 3 to 50 wt. %.

A catalyst-modified web-filler can be used as all or part of the filler material in the wrapper-making processes or can be distributed directly onto the wrapper, such as by spraying or coating onto wet or dry base web. In production of a cigarette, the wrapper is wrapped around cut filler to form a tobacco rod portion of the smoking article by a cigarette-making machine, which has previously been supplied or is continuously supplied with tobacco cut filler and one or more ribbons of wrapper.

The catalyst can be incorporated in the wrapper of a cigarette wherein the wrapper comprises a first wrapper and a second outermost wrapper. Preferably, the catalyst is incorporated in the first inner wrapper. The total amount of catalyst in the second outer wrapper is preferably less than 50 mg for a given single cigarette, more preferably the second outer wrapper does not include the catalyst so as to provide a cigarette whose appearance is not affected by coloration from the catalyst.

A cigarette wrapper can be any wrapping suitable for surrounding the cut filler, including wrappers containing flax, hemp, kenaf, esparto grass, rice straw, cellulose and so forth. Optional filler materials, flavor additives, and burning additives can be included in the cigarette wrapper. The wrapper can have more than one layer in cross-section, such as in a bi-layer wrapper as disclosed in commonly-owned U.S. Pat. No. 5,143,098, the entire content of which is herein incorporated by reference.

The catalysts are capable of converting CO to $CO_2$ at low temperatures, and therefore can be incorporated in the filter element of a cigarette. The filter element may comprise a mono filter, a dual filter, a triple filter, a single- or multiple-cavity filter, a recessed filter or a free-flow filter. The catalyst can be incorporated into one or more filter parts selected from the group consisting of a shaped wrapper insert, a plug, a space between plugs, cigarette filter wrapper, plug wrap, a cellulose acetate sleeve, a polypropylene sleeve, and a free-flow sleeve. Optionally, the filter can further comprise additives such as flavorants or adsorbents.

The catalyst will preferably be distributed throughout the tobacco rod, cigarette filter material and/or the cigarette wrapper portions of a cigarette. By providing the catalyst throughout one or more components of a cigarette it is possible to reduce the amount of carbon monoxide drawn through the cigarette, particularly at the combustion, pyrolysis, condensation and/or filter regions.

Techniques for cigarette manufacture are known in the art. Any conventional or modified cigarette making technique may be used to incorporate the catalyst. The cut filler composition is optionally combined with other cigarette additives, and provided to a cigarette-making machine to produce a tobacco column, which is then wrapped in a cigarette wrapper, and optionally tipped with filters. The resulting cigarettes can be manufactured to any known specifications using standard or modified cigarette making techniques and equipment.

Cigarettes may range from about 50 mm to about 120 mm in length. The circumference is from about 15 mm to about 30 mm, preferably about 25 mm. The tobacco packing density is typically between the range of about 100 mg/cm$^3$ to about 300 mg/cm$^3$, and preferably 150 mg/cm$^3$ to about 275 mg/cm$^3$.

EXAMPLES

Aged CuO—ZnO catalysts were prepared by co-precipitation from an aqueous solution containing 0.5 M $Cu(NO_3)_2$ $2.5H_2O$ and $Zn(NO_3)_2 6H_2O$. A mixture of copper and zinc hydroxides were co-precipitated at a pH of 7 by the drop-wise addition of a 0.5 M NaOH solution to the nitrate solution taken in a 600 mL beaker under vigorous stirring. The mixture was aged in the mother liquor at 60° C. for 3 hours before being cooled to room temperature while stirring. The mixture was then filtered, washed several times with de-ionized water, and dried overnight in an oven at 110° C. The dried samples were calcined at 450° C. for 4 hours at a heating rate of 10° C./minute.

CuO—ZnO—$CeO_2$ catalysts were prepared by including $Ce(NO_3)_3 2.5H_2O$ as a precursor for $CeO_2$ and co-precipitating a mixture of cerium, copper, and zinc hydroxides, as described above. The mixture was not aged. The mixture was filtered, washed, dried, and calcined, as described above.

BET (Brunauer, Emmett, Teller) surface areas of the catalysts were determined by nitrogen adsorption at liquid nitrogen temperature (−196° C.) using a Micromeritics Auto Chem II (Model 2920) unit. Particle size measurements of the catalyst samples were carried out using a Laser Scattering Particle Size Distribution Analyzer (Horiba, Model L-910). Catalyst BET surface areas and particle sizes can be found in Table 1.

TABLE 1

| Catalyst BET Surface Areas and Particle Sizes | | |
|---|---|---|
| Catalyst | BET Surface Area ($m^2$/g CATALYST) | Particle Size (μm) |
| 60CuO—40ZnO | 7 | 7.9 |
| Aged 60CuO—40ZnO | 36 | 4.4 |
| 50CuO—40ZnO—10$CeO_2$ | 25 | 7.6 |
| 40CuO—40ZnO—20$CeO_2$ | 52 | 3.1 |
| 60CuO—30ZnO—10$CeO_2$ | 12 | 3.3 |
| 60CuO—40$CeO_2$ | 88 | 2.8 |

As noted from Table 1, while the BET surface area of the catalyst increased upon adding $CeO_2$ to the catalyst or aging during the synthesis, the particle size of the catalyst decreased upon adding $CeO_2$ to the catalyst or aging during the synthesis.

X-ray diffraction (XRD) analyses of the catalysts were carried out using a Philips X'pert X-ray diffractometer, employing Cu $K_a$ radiation, operated at 45 kV and 40 mA. FIG. 1 shows an XRD spectra of 40CuO-40ZnO-20$CeO_2$, 50CuO-40ZnO-10$CeO_2$, aged 60CuO-40ZnO, and 60CuO-40ZnO catalysts. XRD analysis shows peaks corresponding to CuO and ZnO in CuO—ZnO catalysts and CuO, ZnO, and $CeO_2$ in CuO—ZnO—$CeO_2$ catalysts.

Without wishing to be bound by theory, it is believed that adding $CeO_2$ to the catalyst or aging during the synthesis reduces the crystallinity of the phases, resulting in the formation of amorphous material, as evidenced by broad and diffuse XRD peaks. Such a reduction in the crystallinity of the phases, resulting in the formation of amorphous material, is consistent with the increase in BET surface area and decrease in particle size of CuO—ZnO—$CeO_2$ and aged CuO—ZnO catalysts.

Temperature programmed reduction (TPR) and temperature programmed desorption (TPD) studies on the catalyst samples were studied in the same instrument using 7% $H_2$-balance Ar and 7% CO-balance He gas mixtures, respectively. The calcined catalysts were heated in He gas to 450° C. and cooled to room temperature prior to the TPR and TPD studies. For TPR studies, the catalyst was heated in 7% $H_2$-balance Ar mixture flowing at 50 mL/minute to 500° C. at a heating rate of 10° C./minute. For TPD studies, the pretreated catalyst was saturated with CO at room temperature using 7% CO-balance He mixture flowing at 50 mL/minute. After the saturation of the surface, the catalyst was heated under a temperature programmed mode to 400° C. at a heating rate of 10° C./minute.

Figures 2A, 2B, 2C, 2D, 2E, 2F, 2G:
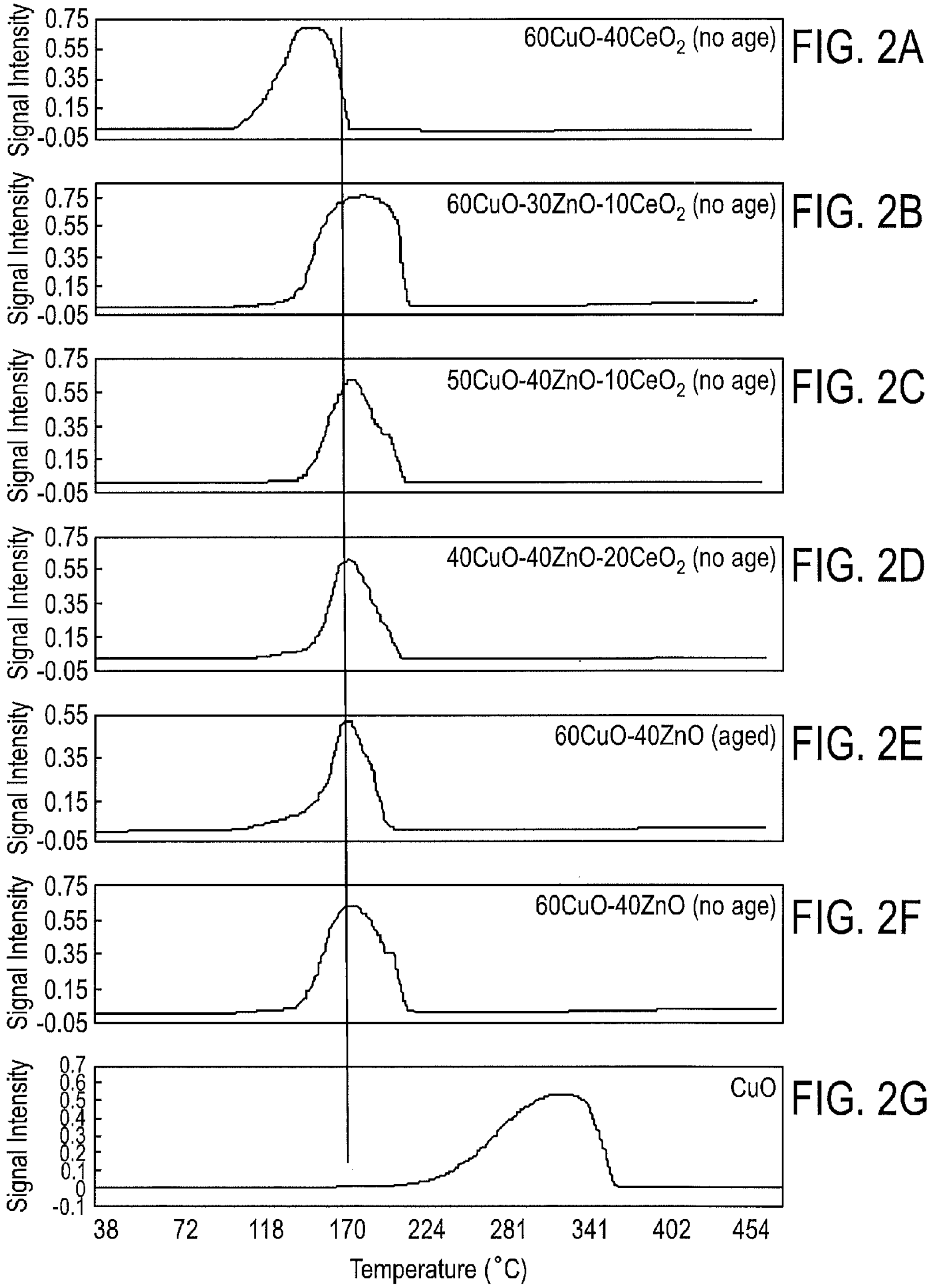
FIG. 2 shows temperature programmed reduction profiles for catalysts of 60CuO-40$CeO_2$ (FIG. 2*a*), 60CuO-30ZnO-10$CeO_2$ (FIG. 2*b*), 50CuO-40ZnO-10$CeO_2$ (FIG. 2*c*), 40CuO-40ZnO-20$CeO_2$ (FIG. 2*d*), aged 60CuO-40ZnO (FIG. 2*e*), 60CuO-40ZnO (FIG. 2*f*), and CuO (FIG. 2*g*).

FIG. 2 shows temperature programmed reduction profiles of 60CuO-40$CeO_2$ (FIG. 2*a*), 60CuO-30ZnO-10$CeO_2$ (FIG. 2*b*), 50CuO-40ZnO-10$CeO_2$ (FIG. 2*c*), 40CuO-40ZnO-20$CeO_2$ (FIG. 2*d*), aged 60CuO-40ZnO (FIG. 2*e*), 60CuO-40ZnO (FIG. 2*f*), and CuO (FIG. 2*g*) catalysts. While not shown, $CeO_2$ starts to reduce at 350-400° C. and no reduction of ZnO is observed even at 400° C. As can be seen from FIG. 2*g*, the reduction of CuO commences at around 200° C. with the peak maximum at around 300° C. As can be seen from FIGS. 2*a*-2*f*, substitution of CuO with ZnO and/or $CeO_2$ yields decreased reduction temperatures. The 60CuO-40ZnO catalyst of FIG. 2*f* shows a broad reduction peak centered around 175° C. (α-peak) with a shoulder peak at ~205° C. (β-peak). A high temperature (~300° C.) peak (γ-peak) is not observed in CuO—ZnO samples. All the peaks correspond to the reduction of copper oxide. The aged CuO—ZnO catalyst of FIG. 2*e* shows a shift of the reduction maximum to a lower temperature in addition to the narrowing of the peak, suggesting a higher dispersion of CuO. Comparing the 60CuO-40ZnO catalyst of FIG. 2*f* with the 60CuO-30ZnO-10$CeO_2$ catalyst of FIG. 2*b*, substituting ZnO with $CeO_2$ does not seem to be advantageous.

FIG. 2 suggests that addition of $CeO_2$ improves reducibility of the catalyst. The low temperature (170-175° C.) α-peak of FIGS. 2*b*-2*f* may be attributed to $H_2$ uptake by interfacial oxygen ions formed from the interaction of CuO with $CeO_2$ or the finely divided ZnO in the aged CuO—ZnO catalyst. The low temperature (<200° C.) reduction peaks of FIGS. 2*b*-2*d* have been ascribed to the reduction of copper oxide clusters strongly interacting with $CeO_2$, whereas the peaks at temperatures higher than 200° C. correspond to CuO not interacting with $CeO_2$.

Figure 3:
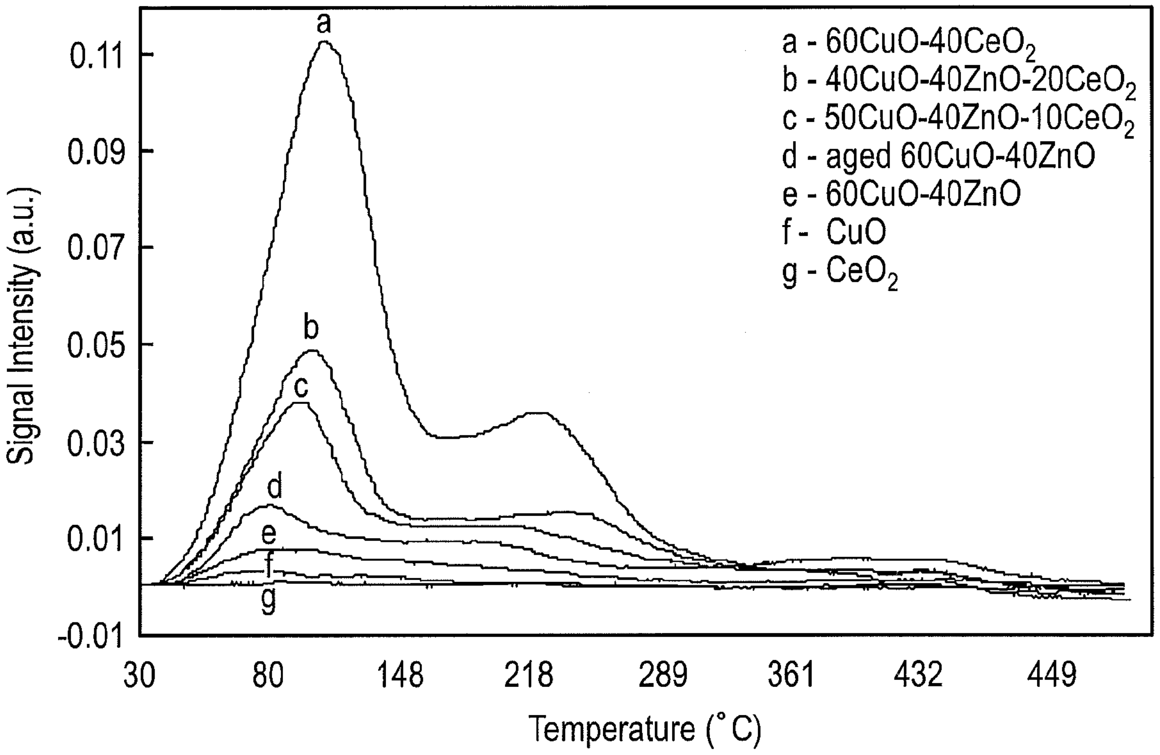
FIG. 3 shows temperature programmed desorption profiles of CO over catalysts of 60CuO-40$CeO_2$ (curve a), 40CuO-40ZnO-20$CeO_2$ (curve b), 50CuO-40ZnO-10$CeO_2$ (curve c), aged 60CuO-40ZnO (curve d), 60CuO-40ZnO (curve e), CuO (curve f), and $CeO_2$ (curve g).
Figure 4A:
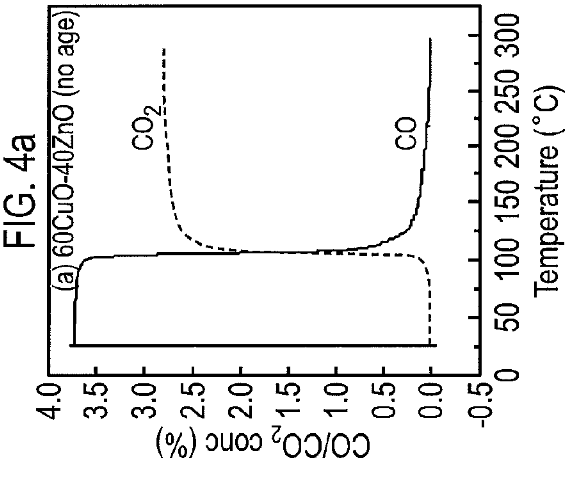
FIG. 4 shows CO oxidation results for catalysts of 60CuO-40ZnO (FIG. 4*a*), aged 60CuO-40ZnO (FIG. 4*b*), 50CuO-40ZnO-10$CeO_2$ (FIG. 4*c*), 40CuO-40ZnO-20$CeO_2$ (FIG. 4*d*), and 60CuO-40$CeO_2$ (FIG. 4*e*).
Figure 4B:
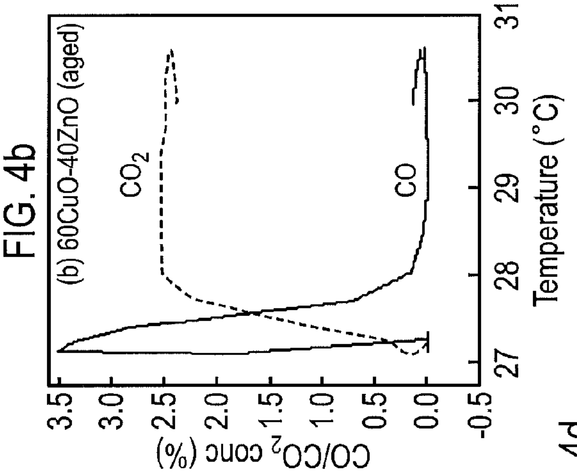
Figure 4C:
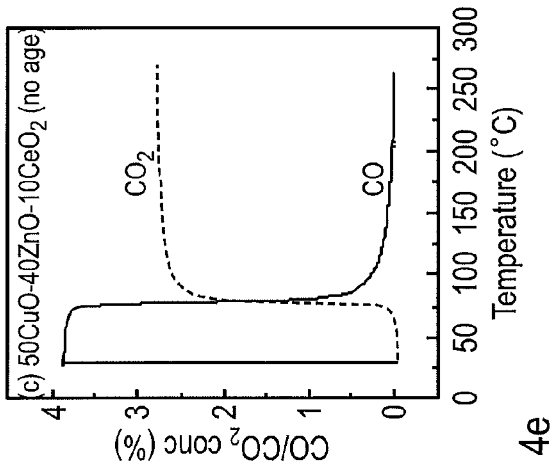
Figure 4D:
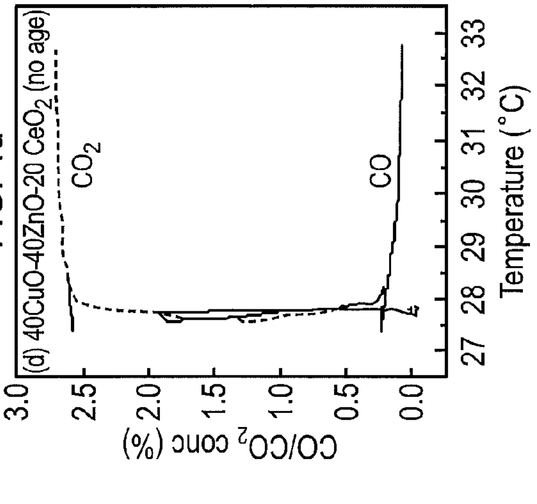
Figure 4E:
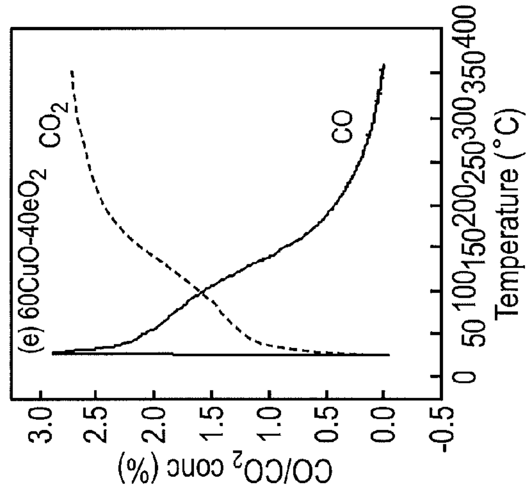

FIG. 3 shows temperature programmed desorption profiles of CO over 60CuO-40$CeO_2$ (curve a), 40CuO-40ZnO-20$CeO_2$ (curve b), 50CuO-40ZnO-10$CeO_2$ (curve c), aged 60CuO-40ZnO (curve d), un-aged 60CuO-40ZnO (curve e), CuO (curve f), and $CeO_2$ (curve g) catalysts. FIG. 3 reveals no appreciable CO adsorption at room temperature for CuO (curve f) or $CeO_2$ (curve g), whereas CuO—ZnO (curves d and e) and CuO—ZnO—$CeO_2$ (curves b and c) did show room temperature CO adsorption. The aged CuO—ZnO catalyst (curve d) showed higher CO adsorption capacity than the un-aged CuO—ZnO catalyst (curve e), as did the CuO—ZnO—$CeO_2$ catalyst (curves b and c). The 40CuO-40ZnO-20$CeO_2$ catalyst (curve b) showed higher CO adsorption capacity than the 50CuO-40ZnO-10$CeO_2$ catalyst (curve c). The TPR and TPD results indicate that the presence of $CeO_2$ improves catalyst reducibility and consequently CO-adsorption capacity.

CO oxidation reactions were studied using approximately 100 mg of the calcined catalyst sample loaded between two glass wool beds in a horizontal quartz tube reactor (8 mm i.d., 60 cm length) placed inside a programmable tube furnace (Thermolyne, Model 48000). A 3.6% CO-21% $O_2$-balance Ar gas mixture was passed over the catalyst bed at a flow rate of 1 L/minute. A thermocouple in the middle of the furnace and a second thermocouple inside the reactor in contact with the catalyst bed measured the temperatures of the heating zone of the furnace and the catalyst bed, respectively. A temperature rise was observed as the reaction gas mixture was passed through the catalyst bed due to the exothermic nature of the oxidation reaction. The temperature rise was controlled by externally cooling the reactor bed by a strong flow of air over the reactor surface, which kept the temperature of the catalyst bed around 30° C. Analysis of the gas mixture after passing through the catalyst bed was carried out using a NLT2000 multi-gas analyzer (Rosemount Analytical, Orville, Ohio), which is capable of measuring concentrations of CO, $CO_2$ and $O_2$.

FIG. 4 shows CO oxidation results of 60CuO-40ZnO (FIG. 4*a*), aged 60CuO-40ZnO (FIG. 4*b*), 50CuO-40ZnO-10$CeO_2$ (FIG. 4*c*), 40CuO-40ZnO-20$CeO_2$ (FIG. 4*d*), and 60CuO-40$CeO_2$ (FIG. 4*e*) catalysts at a space velocity of ~150,000 $h^{-1}$. The catalysts were pretreated in the reaction mixture at 100° C. before cooling down to room temperature prior to the activity tests. The 60CuO-40ZnO catalyst of FIG. 4*a* shows oxidation of CO at ~100° C., whereas the aged 60CuO-40ZnO catalyst of FIG. 4*b* affords complete oxidation of CO at room temperature. While the 50CuO-40ZnO-10$CeO_2$ catalyst of FIG. 4*c* has a light-off temperature of ~75° C., the 40CuO-40ZnO-20$CeO_2$ catalyst of FIG. 4*d* has a room temperature light-off temperature, affording complete oxidation of CO to $CO_2$. Substitution of $CeO_2$ for ZnO, for example, the 60CuO-40$CeO_2$ catalyst of FIG. 4*e* and a 60CuO-30ZnO-10$CeO_2$ catalyst (not shown), was not found to be effective.

These results indicate that ZnO is required for better CuO dispersion, whereas $CeO_2$ added to CuO—ZnO improves the reducibility of the catalysts. Control studies reveal no observable oxidation activity (light-off) below 200° C. for $CeO_2$ or ZnO. CuO has a light-off temperature of 160° C., with complete CO oxidation occurring at temperatures above 250° C. under identical reaction conditions. The CO oxidation activity results over the catalysts are consistent with the TPR and TPD results; increase in the reducibility and CO adsorption capacity significantly improves the oxidation activity and brings down the light-off temperature of the catalysts.

Figure 5:
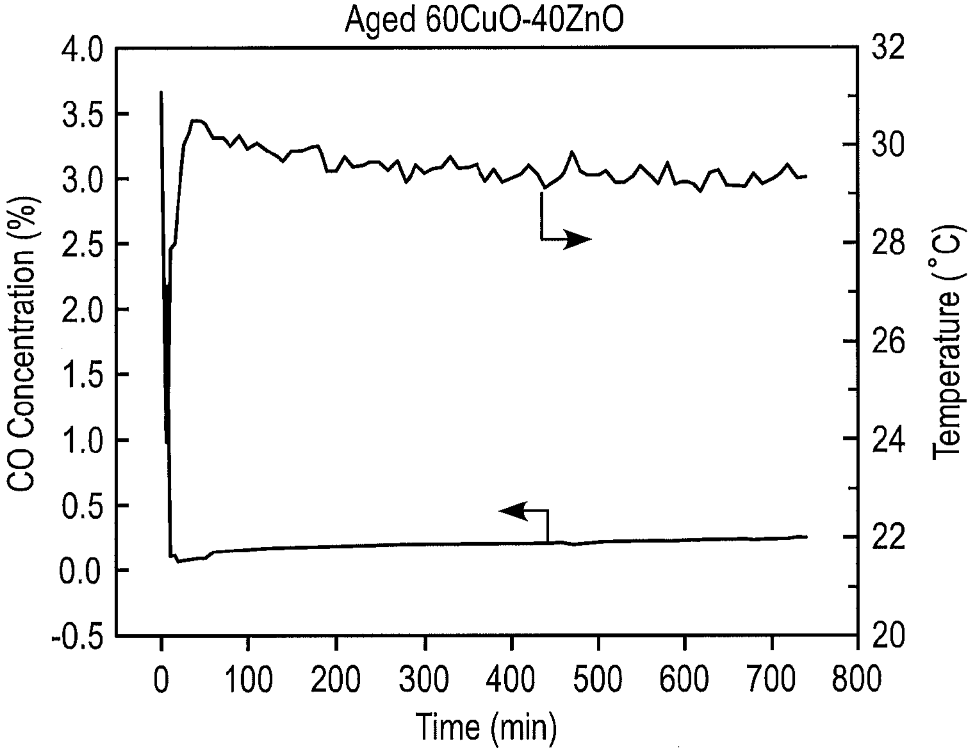
FIG. 5 shows time-on-stream studies for a catalyst of aged 60CuO-40ZnO as a function of CO concentration and temperature.

FIG. 5 shows time-on-stream studies on a Cu—ZnO catalyst as a function of CO concentration and temperature. FIG. 5 does not show any significant loss of catalyst activity after reaction for 12 hours at about 30° C. CO conversion, determined by CO concentration, fell by about 11% after 12 hours, suggesting that the Cu—ZnO catalyst is moderately stable with a fairly sustainable activity for 12 hours at about 30° C.

However, when the reaction is carried out for 12 hours at 50° C., the activity of the CuO—ZnO catalyst was found to diminish. Table 2 compares catalyst BET surface areas for unreacted catalysts of 40CuO-40ZnO-20$CeO_2$ and aged 60CuO-40ZnO and the catalysts of 40CuO-40ZnO-20$CeO_2$ and aged 60CuO-40ZnO after reaction for 12 hours at 50° C.

TABLE 2

Catalyst BET Surface Areas and Particle Sizes

| Catalyst | BET Surface Area ($m^2$/g CATALYST) |
|---|---|
| Aged 60CuO—40ZnO | 36 |
| Aged 60CuO—40ZnO after reaction at 50° C. for 12 hours | 9 |
| 40CuO—40ZnO—20$CeO_2$ | 52 |
| 40CuO—40ZnO—20$CeO_2$ after reaction at 50° C. for 12 hours | 50 |

Figure 6:
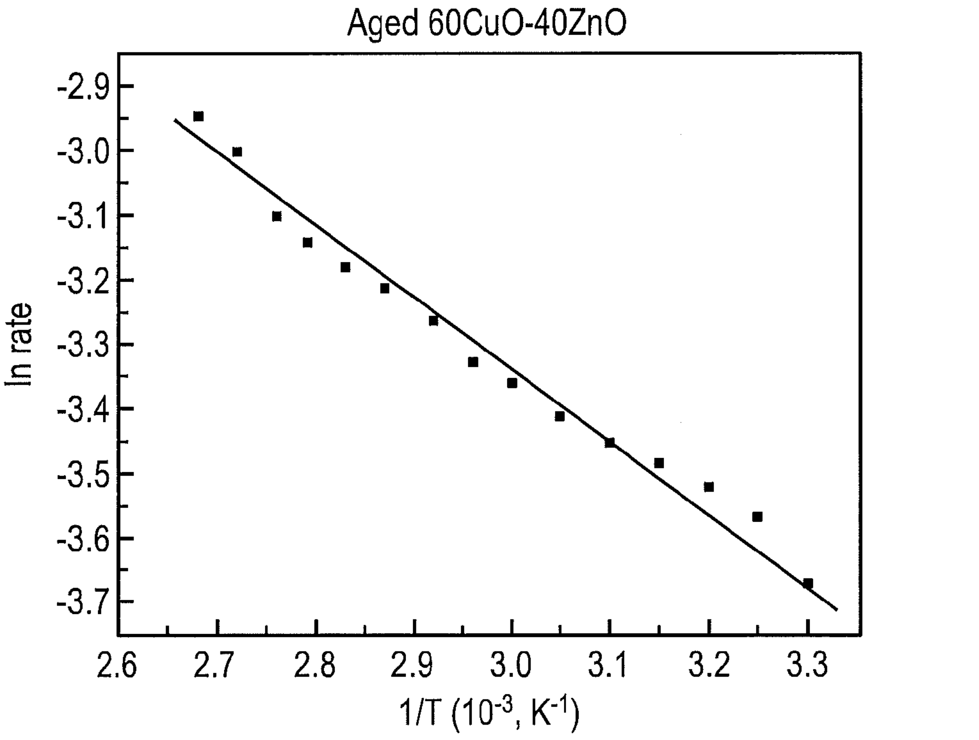
FIG. 6 shows an Arrhenius plot (reaction rate versus inverse of temperature) for CO oxidation over a catalyst of aged 60CuO-40ZnO.

As noted from Table 2, the BET surface area of the aged 60CuO-40ZnO catalyst decreased after reaction for 12 hours at 50° C. As further noted from Table 2, 40CuO-40ZnO-20$CeO_2$ catalyst did not show any appreciable decrease in BET surface area after reaction for 12 hours at 50° C. FIG. 6 shows an Arrhenius plot (reaction rate versus inverse of temperature) for CO oxidation over aged 60CuO-40ZnO and provides an estimated activation energy of 8.9 $kJmol^{-1}K^{-1}$.

The copper oxide-zinc oxide catalyst includes from about 20% to about 80% by weight of copper oxide and from about 20% to about 80% by weight of zinc oxide, more preferably the copper oxide-zinc oxide catalyst includes from about 30% to about 70% by weight of copper oxide and from about 30% to about 70% by weight of zinc oxide, and most preferably the copper oxide-zinc oxide catalyst includes from about 40% to about 60% by weight of copper oxide and about 40% by weight of zinc oxide.

The copper oxide-zinc oxide-cerium oxide catalyst includes from about 20% to about 80% by weight of copper oxide, from about 20% to about 80% by weight of zinc oxide, and from greater than about 0% to about 40% by weight of cerium oxide, more preferably the copper oxide-zinc oxide-cerium oxide catalyst includes from about 30% to about 70% by weight of copper oxides, from about 30% to about 70% by weight of zinc oxide, and from about 10% to about 30% by weight of cerium oxide, and most preferably the copper oxide-zinc oxide-cerium oxide catalyst includes from about 40% to about 60% by weight of copper oxide, about 40% by weight of zinc oxide, and from about 10% to about 20% by weight of cerium oxide.

While various embodiments have been described, it is to be understood that variations and modifications may be resorted to as will be apparent to those skilled in the art. Such variations and modifications are to be considered within the purview and scope of the claims appended hereto.

What is claimed is:

1. A cigarette comprising a tobacco rod, cigarette paper and a filter, said filter including a catalyst consisting of copper oxide, zinc oxide, and cerium oxide, wherein the catalyst is catalytically active for oxidation of carbon monoxide at room temperature.

2. A method of oxidizing carbon monoxide to carbon dioxide comprising contacting the copper oxide-zinc oxide-cerium oxide catalyst in the cigarette of claim 1 with mainstream smoke containing carbon monoxide.

3. The cigarette of claim 1, wherein the catalyst comprises nanoscale particles.

4. The cigarette of claim 1, wherein (a) the catalyst includes from about 20% to about 80% by weight of copper oxide, from about 20% to about 80% by weight of zinc oxide, and from greater than about 0% to about 40% by weight of cerium oxide, (b) the catalyst includes from about 30% to about 70% by weight of copper oxide, from about 30% to about 70% by weight of zinc oxide, and from about 10% to about 30% by weight of cerium oxide, or (c) the catalyst includes from about 40% to about 60% by weight of copper oxide, about 40% by weight of zinc oxide, and from about 10% to about 20% by weight of cerium oxide.

* * * * *